United States Patent Office 3,516,154
Patented June 23, 1970

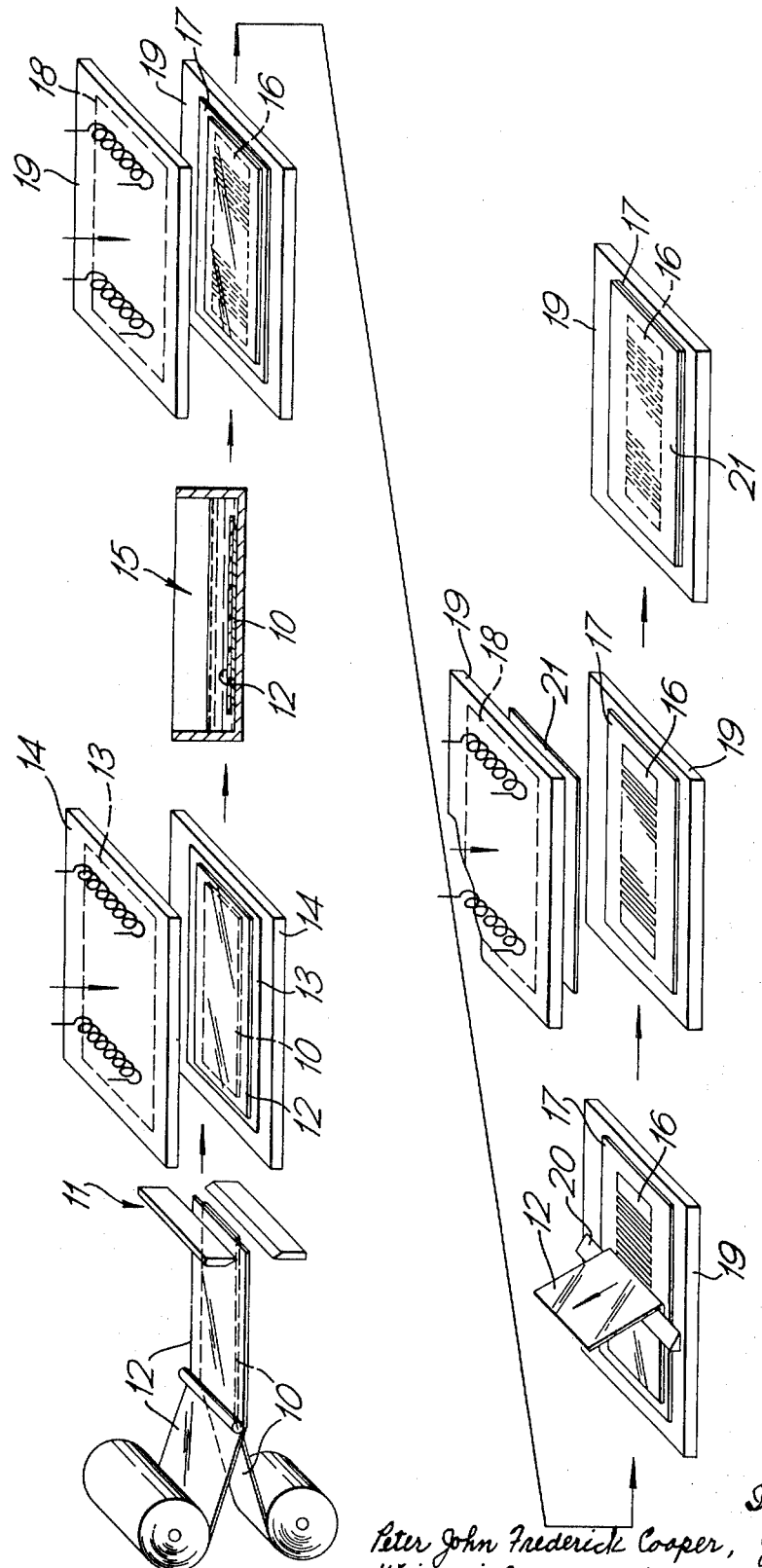

3,516,154
HEATING ELEMENTS AND RESISTORS
Peter John Frederick Cooper, Crowborough, Sussex, John Wainwright, Ifield, near Crawley, Sussex, and Michael John Lindfield, Horsham, Sussex, England, assignors to Langley London Limited, Sussex, England, a corporation of the United Kingdom
Filed Apr. 21, 1969, Ser. No. 817,975
Claims priority, application Great Britain, June 12, 1968, 33,494/68
Int. Cl. H05b 3/00
U.S. Cl. 29—611
9 Claims

ABSTRACT OF THE DISCLOSURE

A method of making a sheet like heating element or resistor formed of a foil of resistance metal sandwiched between two layers of silicone resin impregnated micaceous material wherein a film of a synthetic thermoplastic is detachably adhered to the foil under heat and pressure, the foil is then etched to produce the desired resistance pattern is bonded to one of the micaceous layers, the thermoplastic film is stripped off, a second micaceous layer applied to the exposed foil and the whole assembly heated under pressure to cure the resin and bond the layers and foil together.

---

Figure 1:
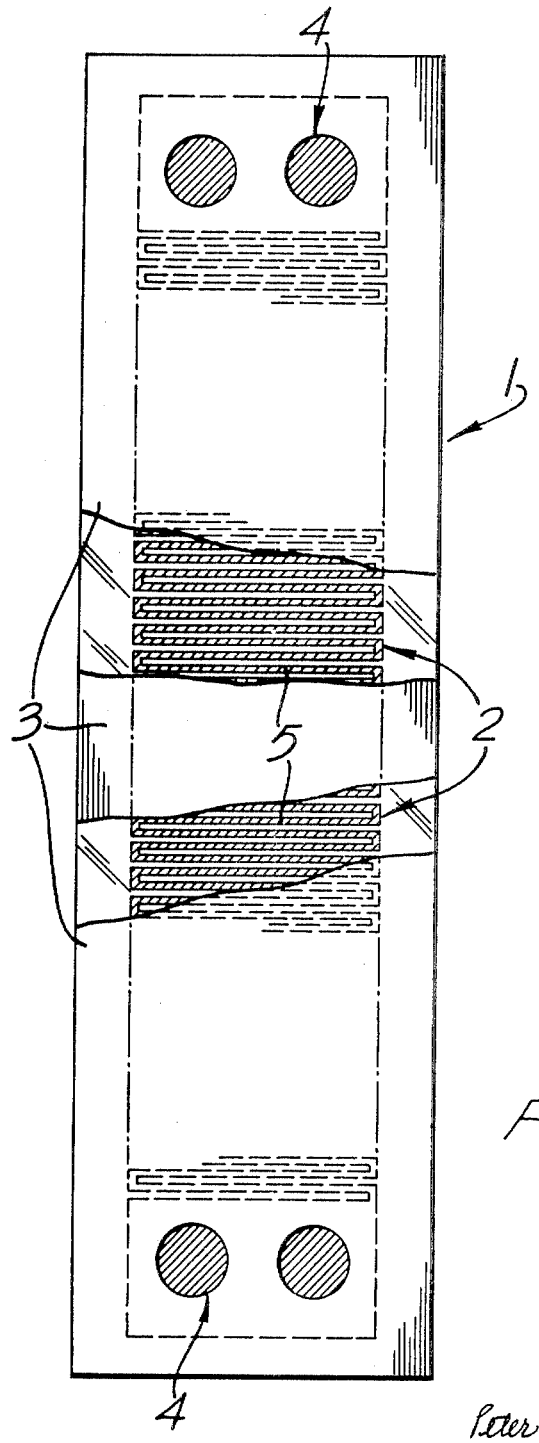

This invention relates to a method of making resistors and heating elements for use in domestic electrical appliances and other electrical equipment.

The problem with which the present invention is concerned is that of putting an etched metal pattern within a laminate formed of insulating sheets so as to produce a resistor or heating element capable of withstanding operating temperatures up to 250° C. and higher.

Existing methods known to the printed circuit industry have proved too costly owing to the number of manufacturing operations involved. Attempts to proceed on the basis of supporting the metal foil on a backing sheet while being etched and subsequently removing the backing sheet by means of a solvent have been a failure owing to residual traces of the material from which the sheet was made being present in the final product.

Similarly experiments carried out using a coating or backing of silicone varnish on the metal proved unsatisfactory because insufficient rigidity was thereby provided in the backed foil to enable it to be printed and etched in the equipment in use at the time. Other backing materials, such as a layer of Kraft paper have also been tried but have had to be discarded.

According to the present invention a method of making a resistance heating element having the form of a sheet and comprising at least two terminal points with an extended electrically conducting path therebetween comprises the steps of:

(a) applying a film of synthetic thermoplastic material under heat and pressure to one surface of a resistance metal foil so as detachably to adhere it thereto;
(b) etching the foil to provide the desired resistance pattern;
(c) applying the etched foil with the film uppermost to a synthetic resin-impregnated lamina of insulating material so as to adhere the foil thereto;
(d) stripping the thermoplastic material from the foil;
(e) applying a further lamina of synthetic-resin-impregnated insulating material to the exposed surface of the foil; and
(f) bonding the sandwiched assembly under heat and pressure into a homogeneous sheet.

The invention will now be described with reference to the accompanying drawings in which:

FIG. 1 is an elevational view (partly broken away) of a heating element for a domestic appliance made in accordance with the invention, and FIG. 2 is a schematic representation of the steps used in the process of the present invention applied to the manufacture of a heating element such as is shown in FIG. 1.

Referring to FIG. 1 of the drawing heating element 1 comprises a resistance metal foil 2 which has been etched to provide a labyrinthic pattern 5 sandwiched between layers 3 of insulating resin bonded "Filamic" mica paper, each layer comprising two sheets of "Filamic" paper. One of the layers 3 is apertured to allow access to two terminal areas 4 located respectively at each end of the pattern 5. The number of layers may be increased to meet the requirement of the application. Satisfactory results have been obtained using a silicone resin. The resistance metal foil is commonly a nickel-chromium alloy, but other materials such as nickel- chromium-iron or copper-nickel or nickel-chromium aluminium alloys may be used. The foil thickness may be as little as 0.0005″ but is normally about 0.001–0.002″ depending on the application.

In the preferred method of manufacture, illustrated diagramatically in FIG. 2, a resistance metal foil is attached to a layer of material which is resistant to the etching acid or process, the said layer providing a mount during the etching operation and subsequently being stripped from the etched pattern after the latter has been laid on to one of the two micaceous sheets which form the laminate.

Satisfactory results have been obtained using a laminating grade polyethylene film as the mount. In carrying out the present invention the resistance metal foil 10 is degreased, straightened and cut at a cutting station 11 to the required size and the polyethylene film 12 is cut so that it overlaps the metal on all sides. One layer of metal and one layer of film are placed together with a protective sheet 13, e.g. of silicone treated paper, on each side to prevent unwanted adhesion to other materials during the process. The sheets are loaded into a steam heated hydraulic press 14 and heat and pressure applied to cause the film to adhere to the metal foil. The conditions are selected and applied with care because otherwise either too much adhesion or too little adhesion can be obtained rendering the material unusable. When the press has cooled, the sheets are removed and the printing and etching processes completed, as indicated generally at 15, to give an element 16.

After the etching process and the removal of the ink or other resist has been carried out, the required etched pattern is left firmly supported on its sheet of polyethylene. This film is taken with the etched pattern on the underside and placed carefully on top of the "Filamic" or other insulating sheet 17 which is to become the insulation on one half of the element. The pattern is laid down carefully within a given area to ensure that the correct creepage distances exist to the edges and also that the terminations of the element come within prescribed areas on the element. A sheet of material such as PTFE/glass fabric 18 is then laid on top of the polyethylene and pressure and heat applied to the surface by a press 19 for a few seconds. In some circumstances this heat and pressure can be applied manually.

The PTFE/glass sheet is then removed and the polyethylene film 12 peeled over a straight edge 20 to provide an abrupt change of angle at the point of separation at the surface of the "Filamic" layer and at the same time to leave the etched pattern firmly adhering to the "Filamic" layer.

The next stage is to apply an additional layer 21 of "Filamic" sheet on top of the metal pattern so that the pattern is sandwiched between layers of "Filamic." Heat and pressure are then applied to produce one single homogeneous sheet with the etched metal pattern 16 sandwiched inside it. Typical conditions comprise a first treatment under a pressure of 500 p.s.i. and at a temperature of 160°–200° C. for 30–80 minutes followed by a second heat treatment at 400°–450° for 5–10 hours. In certain of these applications the final cure may be carried out in situ in the appliance.

The process of the invention is illustrated in the following example:

EXAMPLE

A strip of chromium nickel alloy foil of thickness 0.001" was degreased and laid onto a sheet of polyethylene of thickness 0.002" (Laminating Grade S.L. made by British Cellophane Limited) the upper face of which had been "keyed" during manufacture.

The foil and polyethylene were then placed between press steels using a release medium to prevent adhesion of the polyethylene to the steels and the assembly was then placed in a press. Further assemblies were stacked to form a load and a pressure of 50 p.s.i. was then applied to the press. After the pressure had been applied steam was then introduced into the press to give a platen temperature of approximately 130° C., this temperature being held for 20 minutes before the press was stripped and excess polyethylene film trimmed from the edges of the foil. At this stage the polyethylene was adhered to the foil over the entire surface of the latter.

The foil and polyethylene film were then removed and engraved by a photoresist technique to give the desired resistor pattern following which excess metal was removed using ferric chloride to leave the pattern on the polyethylene film. The adhesion between the foil and the polyethylene was sufficiently good that only excess metal and not the photo resist pattern was removed, thus providing a sharply defined resistor pattern.

After removing the resist, washing and drying, the polyethylene backed pattern was placed on an impregnated piece of "Filamic" paper with the metal foil face downwards and a sheet of PTFE/glass fabric was placed over it. A hot iron was then applied to the PTFE surface for several seconds under hand pressure at a temperature of 200–250° C. to promote adhesion of the foil pattern to the "Filamic" sheet after which the PTFE/glass fabric sheet was removed. Stripping of the polyethylene from the foil was then possible as the adhesion between the foil and the "Filamic" sheet was greater than that between the foil and the polyethylene.

The stripping took place with the aid of a straight edged flat metal bar which was positioned at one end of the pattern so that it extended laterally thereof, the bar being pressed lightly against the polyethylene. The bar was then moved in a direction perpendicular to its length longitudinally of the pattern and the polyethylene was pulled over the trailing edge of the bar in the direction of movement of the bar so as to provide a large angle of divergence at the point of separation of the polyethylene from the foil. The polyethylene was then discarded and a further sheet of "Filamic" paper placed on the now-exposed upper surface of the pattern. The completed assembly was then loaded into a press and cured under 500 p.s.i. at a temperature of 180° C. for 50 minutes followed by a second heat treatment at 400° C. for 6 hours.

It will be appreciated that the shape and extent of the heating elements made according to the present invention as well as the layout of the electrically conducting path can be varied at will to suit the article for which they are designed, such articles including electric kettles, electric cookers, toasters, space heaters, and water heaters, irons and other domestic and industrial appliances.

What is claimed is:

1. A method of making a resistance heating element having the form of a sheet and comprising at least two terminal points with an extended electrically conducting path therebetween comprising the steps of:
   (a) applying a film of synthetic thermoplastic material under heat and pressure to one surface of a resistance metal foil so as detachably to adhere it thereto;
   (b) etching the foil to provide the desired resistance pattern;
   (c) applying the etched foil with the film uppermost to a synthetic resin-impregnated lamina of insulating material so as to adhere the foil thereto;
   (d) stripping the thermoplastic material from the foil;
   (e) applying a further lamina of synthetic-resin-impregnated insulating material to the exposed surface of the foil; and
   (f) bonding the sandwiched assembly under heat and pressure into a homogeneous sheet.

2. A method according to claim 1 wherein the thermoplastic material is polyethylene.

3. A method according to claim 1 wherein the laminae of insulating material each comprise at least one layer of micaceous material taken from the group mica, built up mica and mica paper.

4. A method according to claim 1 wherein the application of the etched foil with the film uppermost to the synthetic resin-impregnated lamina takes place under heat and pressure thereby causing partial curing of the synthetic resin and adherence of the foil to the lamina.

5. A method according to claim 4 wherein the synthetic resin is a silicone resin.

6. A method of making a resistance heating element having the form of a sheet and comprising at least two terminal points with an extended electrically conducting path therebetween comprising the steps of:
   (a) applying a film of polyethylene to one surface of a resistance metal foil under a pressure of 50 p.s.i. and a temperature of about 130° C. so as to adhere the film to the foil;
   (b) engraving the foil by a photoresist technique to give the desired extended path pattern followed by etching of the foil to remove the excess metal;
   (c) applying the etched foil with the polyethylene film uppermost to a silicone resin-impregnated lamina of micaceous material under conditions of temperature and pressure sufficient to partially cure the resin and adhere the foil to the lamina without affecting the film;
   (d) stripping the polyethylene film from the foil;
   (e) applying a further lamina of silicone resin impregnated micaceous material to the exposed foil surface; and
   (f) heating the sandwiched assembly under pressure so as to cure the resin fully and bond the assembly into a homogeneous sheet.

7. A method according to claim 6 wherein the stripping of the polyethylene film from the foil is carried out by causing the film to have a large angle of divergence from the foil at its point of separation therefrom.

8. A method according to claim 7 wherein the angle of divergence is obtuse with respect to the exposed surface of the foil.

9. A method of making a resistor having the form of a sheet and comprising at least two terminal points with an extended electrically conducting path therebetween comprising the steps of:
(a) applying a film of synthetic thermoplastic material under heat and pressure to one surface of a resistance metal foil so as detachably to adhere it thereto;
(b) etching the foil to provide the desired resistance pattern;
(c) applying the etched foil with the film uppermost to a synthetic resin-impregnated lamina of insulating material so as to adhere the foil thereto;
(d) stripping the thermoplastic material from the foil;
(e) applying a further lamina of synthetic-resin-impregnated insulating material to the exposed surface of the foil; and
(f) bonding the sandwiched assembly under heat and pressure into a homogeneous sheet.

References Cited

UNITED STATES PATENTS

| | | | |
|---|---|---|---|
| 2,408,093 | 9/1946 | Patterson | 29—610 |
| 2,482,316 | 9/1949 | Bocking | 29—610 X |
| 2,692,190 | 10/1954 | Pritikin. | |

JOHN F. CAMPBELL, Primary Examiner

U.S. Cl. X.R.

29—624